(12) United States Patent
Grob

(10) Patent No.: US 7,886,275 B2
(45) Date of Patent: Feb. 8, 2011

(54) PROCESS FOR DETERMINING AND PROVIDING RUN TIME INFORMATION FOR ROBOT CONTROL PROGRAMS

(75) Inventor: Franz Grob, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 1033 days.

(21) Appl. No.: 10/970,955

(22) Filed: Oct. 22, 2004

(65) Prior Publication Data

US 2005/0120338 A1 Jun. 2, 2005

(30) Foreign Application Priority Data

Oct. 23, 2003 (DE) ................. 103 49 349

(51) Int. Cl.
*G06F 9/44* (2006.01)
(52) U.S. Cl. ............... 717/125; 717/105; 717/116
(58) Field of Classification Search ............ None
See application file for complete search history.

(56) References Cited

U.S. PATENT DOCUMENTS

| | | | | |
|---|---|---|---|---|
| 4,338,672 | A | * | 7/1982 | Perzley et al. ............... 700/249 |
| 5,177,420 | A | | 1/1993 | Wada et al. |
| 5,428,547 | A | | 6/1995 | Ikeda |
| 5,687,074 | A | | 11/1997 | Tanaka et al. |
| 5,764,857 | A | * | 6/1998 | Suzuki ............... 706/13 |

(Continued)

FOREIGN PATENT DOCUMENTS

DE 4013960 A1 11/1990

(Continued)

OTHER PUBLICATIONS

Yamanobe et al., "Designing of damping control parameters for peg-in-hole considering cycle time" Robotics and Automation, 2004. Proceedings. ICRA '04. 2004 IEEE International Conference on New Orleans, LA, USA Apr. 26-May 1, 2004, Piscataway, NJ, USA, IEEE, US, Apr. 26, 2004, pp. 1129-1134, vol. 2, XP010768794 ISBN: 978-0-7803-8232-9.

(Continued)

*Primary Examiner*—Chuck O Kendall
(74) *Attorney, Agent, or Firm*—Wood, Herron & Evans, LLP

(57) ABSTRACT

In a process for providing run time information for computer programs for controlling industrial robots (robot control programs), a first system time of a computer system executing the program is determined after the calling and before the execution of an individual command or a sequence of individual commands (subroutine). The individual command or the subroutine is subsequently executed, and a second system time of the computer system is determined after the execution. The determination of the system times is carried out on the basis of access times to certain areas of a program memory of the computer system, which areas characterize the individual commands or the subroutine. It is thus possible to carry out run time measurements on robot control programs in a simple and efficient manner, and the results of these run time measurements can be used to optimize such programs.

21 Claims, 2 Drawing Sheets

U.S. PATENT DOCUMENTS

| | | | |
|---|---|---|---|
| 6,078,747 A * | 6/2000 | Jewitt | 717/164 |
| 6,243,611 B1 * | 6/2001 | Hazama et al. | 700/97 |
| 6,496,848 B1 | 12/2002 | Nankaku | |
| 6,567,723 B2 | 5/2003 | Sugawara | |
| 2003/0014743 A1 | 1/2003 | Cooke et al. | |

FOREIGN PATENT DOCUMENTS

| | | |
|---|---|---|
| DE | 42 22 755 | 1/1993 |
| DE | 195 47 990 | 7/1996 |
| EP | 0639808 A1 | 2/1995 |

OTHER PUBLICATIONS

Gonzalez Harbour M et al.: "Response time analysis for tasks scheduled under EDF within fixed priorities" Proceedings of the 24th IEEE Real-Time Systems Symposium. (RTSS 2003). Cancun, Mexico, Dec. 3-5, 2003; [IEEE Real-Time Systems Symposium], Los Alamitos, CA; IEEE Comp. Soc, US, Dec. 3, 2003, pp. 200-209, XP 010674249 ISBN: 978-0-7695-2044-5.

* cited by examiner

PROCESS FOR DETERMINING AND PROVIDING RUN TIME INFORMATION FOR ROBOT CONTROL PROGRAMS

CROSS REFERENCE TO RELATED APPLICATIONS

This application claims the benefit of priority under 35 U.S.C. §119 of DE103 49 349.2 filed Oct. 23, 2003, the entire contents of which are incorporated herein by reference.

FIELD OF THE INVENTION

The present invention pertains to a process for providing run time information for computer programs for controlling industrial robots.

BACKGROUND OF THE INVENTION

Programmable control units, which are designed such that application- and user-specific computer programs can run on them for controlling industrial robots (robot control programs), are usually used to control industrial robots. Such control programs are usually prepared by a user, a robot programmer, and they contain a number of individual commands or sequences of individual commands in the form of procedures or subroutines, via which the motor mechanism of the robot is acted on within the framework of a motion control. The individual commands and the subroutines built up from them comprise, in particular, arithmetic expressions, logic expressions, motion instructions, queuing instructions or the like, by which the motion behavior of the robot can be controlled as a function of the activities to be carried out.

It is generally known that not all the individual commands or subroutines contained in computer programs require an equal portion of the total program run time during the execution of computer programs. This is linked, on the one hand, with the different frequency with which certain commands or subroutines are called, but, on the other hand, also with the internal complexity of these commands and subroutines, which complexity may be inherently given, on the one hand, e.g., in case of certain arithmetic operations such as root operations, but may also result, on the other hand, from an erroneous or non-optimal programming. It is therefore desirable to efficiently identify and eliminate such bottlenecks and weak points of the programming especially in controlling industrial robots that are used to perform repeated motion sequences with the highest possible velocity.

It is known that the run time of robot control programs can be measured for this purpose with an external clock. However, the result of such a measurement is highly inaccurate due to the process and, moreover, only slightly detailed, because it cannot usually be recognized from the outside in which concrete individual command or subroutine the robot control happens to be during the execution of the control program running on it. As an alternative, it was proposed that the robot control program to be checked be expanded by additional program code for a time measurement. Such additional program code comprises, in particular, timekeepers/timers in the program or the setting/resetting of outputs associated with a measurement of the corresponding output signals. It proved to be disadvantageous here, in particular, that due to the insertion of additional program code in the robot control program, the time characteristic of the robot control program, which is to be determined, is changed per se, so that no unambiguous statement can be made from the measuring results obtained on the actual run time characteristic of the robot control program being checked.

SUMMARY OF THE INVENTION

Based on the drawbacks described above, the basic object of the present invention is to provide a process for providing run time information for computer programs for controlling industrial robots in such a way that run time measurements are possible on the robot control program without distortion of the run time characteristic of the robot control program with the most accurate assignment possible of code sections of the robot control program to the time measurements performed.

This object is accomplished in a process of the type described in the introduction in such a way that the time of execution of at least one individual command is determined on the basis of the system time of the process on which the program is executed and is stored together with the individual command or the information characterizing individual commands.

A plurality of individual commands contain a sequence of individual commands in the sense of a subroutine, especially also with a certain depth of recursion. When speaking of a system below, it will be defined as the microprocessor of a computer. The system time contains a (relative) time given by the processor, such as one determined by a timer, especially by the processor cycle of the timer of the control value of the processor.

Provisions are made according to preferred embodiments of the present invention for determining the point in time of access to a memory area of the memory associated with the at least one individual command and the point in time of the termination of the access to the memory area and storing same together with the information characterizing the at least one individual command and/or for storing the information characterizing the storage area associated with the at least one individual command with the time of execution of the at least one individual command.

A concrete variant of the present invention provides for the determination, after calling and before executing an individual command or a sequence of individual commands (subroutine), of a point in time of an access to an area of a program memory of a computer system executing the program, which said area is associated with the individual command or the subroutine, by the computer system itself in the form of a first system time, after which the individual command or the subroutine is executed, and for the determination of a second system time of the computer system by the computer system itself after the execution at the time of termination of the access to the associated memory area.

According to the present invention, the process makes possible the logging of the execution times of individual commands and/or subroutines of a running robot control program without any loss of run time due to additional commands in the program itself. The robot control program does not need to be changed by additional commands for the run time determination according to the process being proposed. Furthermore, the use of the process according to the present invention also does not lead to a deterioration of the cycle time within the framework of the measurement operation, because the interpreter, i.e., the program used to translate the control program source code, which is usually written in a higher program language, into the machine language must process the individual commands or subroutines anyway in the course of the execution of the program, so that the access times can be directly derived from this. According to the present invention, the time period for executing the individual command or subroutine is recorded only implicitly by the storage of the beginning and end system time, and the duration of the storage operation is insignificant in relation to the duration of the command or subroutine.

To make possible an unambiguous assignment between the measuring results and the associated individual command or subroutine of the robot control program for a subsequent evaluation of the run time measuring results, a preferred variant of the process according to the present invention provides for the additional storage of the memory address identifying the individual command or the subroutine. For example, the calling of an individual command or subroutine can be derived in the course of the execution of a robot control program on the basis of accesses to the program stack memory (program stack), in which, among other things, the corresponding return addresses are stored.

Since a subroutine is composed by definition of a number of individual commands, it is possible, in particular, for a subroutine to contain a command by which it will again (partially) call itself recursively in the nested form, i.e., in the form of a loop, or for a first subroutine to call a second, other subroutine. The number of callings thus nested is called depth of recursion. To make it possible to subsequently infer the actual duration of an individual execution of the subroutine during an evaluation from the measured (overall) run time for a recursive subroutine, provisions are made according to a preferred variant of the process according to the present invention for a value of a depth of recursion to be additionally determined for subroutines. The actual run time of the subroutine can thus be calculated from the difference of the determined system times in conjunction with the depth of recursion.

In order to permanently secure the run time measuring results obtained by the process according to the present invention, on the one hand, and, on the other hand, to also make them accessible for a later, optionally external evaluation, provisions may be made for the system times determined and/or the corresponding memory addresses and/or the depth of recursion values to be stored in a nonvolatile memory. Floppy disks, hard disks, zip drives, log drives that can be actuated via a TCP/IP network, flash cards, memory sticks, and the corresponding means in case of a log server via a TCP/IP network may be used, in particular. However, it is also possible to use, in addition or as an alternative, a volatile RAM.

Provisions are made according to an extremely preferred variant of the process according to the present invention for the system times and/or memory addresses and/or depth of recursion values being stored to be used for optimization purposes for the robot control program by a program unit arranged downstream of the recorded data. Provisions may, furthermore, be made in the course of the optimization for suggestions to be issued and/or automatically implemented by the program unit for a rearrangement of the robot control program. For example, the program unit may be designed such that it submits suggestions to a user according to various selection criteria, e.g., run time maxima, subroutines, motion commands, I/O commands, queuing instructions, etc., for a possible optimization, preferably in the graphic form. However, the above-mentioned automatic implementation of such optimization suggestions is also possible in conjunction with suitable expert systems or the like.

Other properties and advantages of the present invention will appear from the following description of an exemplary embodiment on the basis of the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
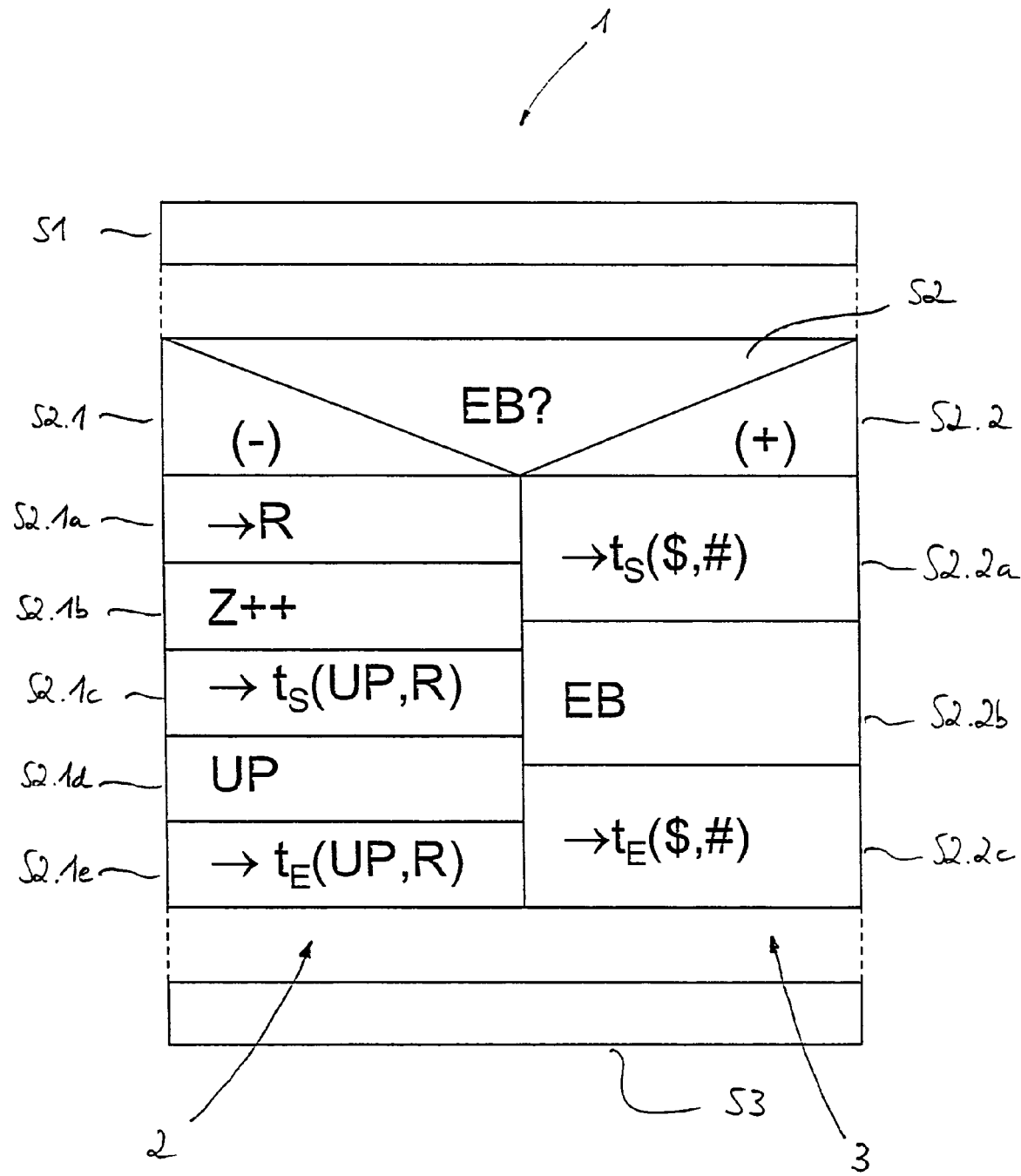
FIG. 1 is a diagram showing the course of a run time determination according to the process according to the present invention.

FIG. 1 shows a flow chart of the process according to the present invention in the form of a structured chart. The run time measuring program shown operates internally within the system at the level of the user programming and provides information in this manner on the program flow without active involvement of the programmer. According to the present invention, the run time program 1 is an interpreter, which collects the data necessary for a run time determination (program name, block number, depth of recursion, system times, . . . ; etc.) by means of a central routine 2, 3 for subroutines or individual commands.

The program flow starts in step S1, which may be followed by additional program steps, as is indicated by the vertical broken lines in FIG. 1. A case decision is performed in step S2 to determine whether the command to be executed in the course of the processing of a robot control program is an individual command (IC) or not. If there is no individual command IC (step S2.1), the run time measurement according to the present invention takes place on a subroutine SR. A variable Z, whose value shows how often the subroutine SR was executed, is determined according to the present invention for this purpose for a counter. An additional variable R designates the depth of recursion of the subroutine SR, e.g., the number of nested callings, where a value of R=0 means that the current calling of the subroutine SR did not take place from the procedure/subroutine itself. Furthermore, variables $t_B$, $t_E$ are defined for the system times at the beginning and at the end of the execution of the subroutine SR. The horizontal arrows in FIG. 1 symbolize the storage of the corresponding values for the variables shown to the right of the arrow on a suitable storage medium, such as a RAM, a floppy disk, a hard disk, a zip drive or a memory stick via a TCP/IP network. The symbols "S" and "#" designate program names (names of subroutines) in the form of alphanumeric character strings and block numbers of a robot control program. The block number shows the position (line) of a command (subroutine or individual command) within a subroutine.

Each time a subroutine is called, the central internal routine 2 in the interpreter 1 performs switching of the context (process environment) from one program to the other. The programs may be the main program or a subroutine. In case of return from the subroutine SR, the same routine 2 will run to the end. The interpreter 1 thus knows the name of each subroutine SR at the time of switching of each subroutine SR and can ultimately run through a complete, so-called stack trace, i.e., the entire calling hierarchy of the subroutine is known. The system times for the beginning ($t_B$) and the end ($t_E$) of the subroutine SR were recorded after the end of the context switching and before the beginning of the context backup (return address of the subroutine SR). The executing program name and the caller along with a block number, from which the subroutine SR is reached, are known and are stored with the system times for the beginning and the end of the subroutine ($t_B$, $t_E$). The block number shows the position (line) of a command (subroutine or individual command) within a subroutine.

EXAMPLE

Program P1 Calls SR1; SR2 is Called in SR1.

```
DEF P1 ( )
  SR1 ( )
END
DEF SR1 ( )
  SR2 ( )
END
DEF SR2 ( )
  ; stop program to display stack trace
  STOP
END
```

If the execution of the robot program is stopped in SR2, the calling hierarchy P1 ( )->SR1 ( )->SR2 ( ) is recognizable on the interpreter stack and can consequently be unambiguously assigned. The system time is always determined when the subroutine is entered and left.

In case of individual commands, the program (subroutine) name of the caller and the block number of the individual command are known in the subroutine. Just as there is a central internal routine 2 in the interpreter 1 for the execution of subroutines SR, there also is a corresponding routine 3 in the interpreter 1 to process individual commands IC. This routine 3, the so-called block interpreter, assigns a system time to the individual command, which is unambiguously identified based on the program (subroutine) name and the block number. After the processing of the block interpreter 3, the block number is increased by 1 in the program (subroutine) and the block interpreter 3 is called again in order to process the next (individual) command.

The depth of recursion R indicates how often a program has called itself to be able to unambiguously assign the particular execution time. The program name "S" and the block number "#" alone are no longer sufficient, because an unambiguous assignment of the execution time to the program name cannot be performed with these data any longer when a plurality of callings of the same subroutine are active. The run time determination is performed for each depth of recursion R in order to have available the overall duration as well as the individual execution time for each depth of recursion R.

EXAMPLE

```
DEF P1 ( )
INT A; integer A
A=FAKULTAET (5)
END
DEF FAKULTAET (INT F)
IF F>1 THEN
RETURN (F*FAKULTAET (F-1)); crossed calling of SR "Fakultat"
ENDIF
RETURN (1)
END
```

Calling Hierarchy (Subroutine FAKULTAET is Designated Here by F for Short): F(5)->F(4)->F(3)->F(2)->F(1)

Depth of Recursion R:

| 0 | 1 | 2 | 3 | 4 |
|---|---|---|---|---|

Execution Time [μsec]:

| 9 | 7 | 5 | 3 | 1 |
|---|---|---|---|---|

Delta Execution Time [μsec]:

| 2 | 2 | 2 | 2 |
|---|---|---|---|

The overall duration for the calculation of the Fakultät is 9 μsec in the example, and a simple calculation takes 2 μsec, and the Fakultat requires 1 μsec at the lowest level, because FAKULTAET (1) can be calculated the fastest (the return value 1 is returned).

The value R for the depth of recursion of the subroutine SR is first stored according to the present invention in step S2.1a. The counter Z is then incremented in step S2.1b, which shows how often the subroutine was executed. The notation "Z++" designates an increase in the counter value by 1, i.e., Z->Z+1. An initial system time $t_s$ for the execution of the subroutine SR is then stored in step S2.1c. The notation "( . . . )" indicates that the storage takes place as a function of the type of the subroutine SR and the depth of recursion R. The execution proper of the subroutine SR will subsequently take place in step S2.1d, and a subroutine SR can be generally described as follows with the use of a simplified BNF notation (BNF: <u>B</u>ackus <u>N</u>aur <u>F</u>orm):

```
<SR>:              "DEF" <name>{<command>} "END"
<command>:=        [<individual command>] | <SR>
<individual command>:=  arithmetic expression | logic expression |...|
                   motion instruction | queuing instruction
```

The individual command IC may consequently be an arithmetic expression, a logic expression or motion or queuing instructions for a robot. The command is consequently an individual command IC or a subroutine SR, and a subroutine SR identified by a certain name will in turn contain a sequence of commands, i.e., individual commands or subroutines. A subroutine SR can thus call itself (additional) subroutines, also in the form of DO statements, which leads to a depth of recursion R>0.

Subsequent to the executions of the subroutine SR in step S2.1d, storage of an end system time $t_E$ is performed in step S2.1e for the subroutine SR and the depth of recursion R.

The run time measurement ends, possibly after additional steps have been executed (broken vertical lines), in step S3.

If the polling in step S2 reveals that the command to be processed is an individual command IC according to the BNF notation (step S2.2), an initial system time $t_s$ is first stored with the program name "S" and the block number "#" in step S2.2a. The individual command IC is subsequently executed in step S2.2b, after which an end system time $t_E$ is stored in step S2.2c with the program name "S" and the block number "#". Unambiguous assignment of system times and the individual command can be achieved based on the program name and the block number.

The process according to the present invention optionally ends after the execution of additional intermediate steps in step S3 even in case of run time measurement on an individual command IC.

If the polling in step S2 reveals that the command to be processed according to the BNF notation is an individual command IC (step S2.2), an initial system time $t_s$ is first stored with the program name "S" and the block number "#" in step S2.2a. The individual command IC is subsequently executed in step S2.2b, after which an end system time $t_E$ with the program name "S" and the block number "#" is stored in step S2.2c. The system times and the individual command can be unambiguously assigned based on the program name and the block number.

The process according to the present invention may possibly end after the execution of additional intermediate steps in step S3 in case of the run time measurement on an individual command IC as well.

Consequently, the program name, the block number, the depth of recursion and the system time at the time of entry into and exit from the subroutine or the beginning and the end of the individual command are necessary according to the present invention for the collection of the measured data for the run time measurement. Storage of individual commands only becomes necessary for the run time measurement only if the program is modified in the meantime by changing, inserting or deleting program lines and the reference of the block number, run time measurement and the program instruction (individual command) would be lost as a result.

Figure 2:
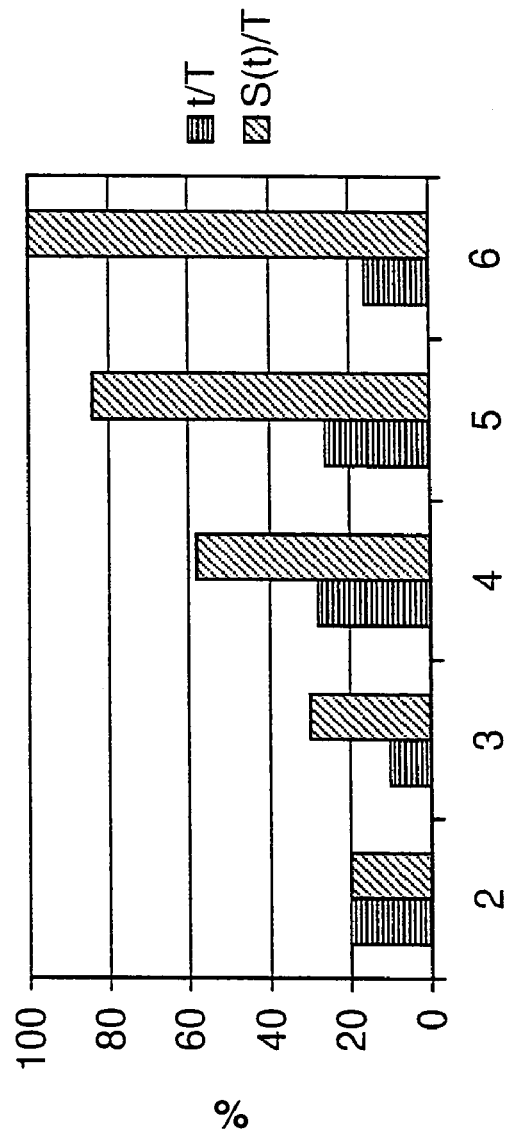
FIG. 2 is a graphic view of the run time measuring results that may be output for optimization purposes.

Based on a concrete exemplary embodiment, FIG. 2 shows the run time data that are available for the optimization of the robot control program in question by means of the process according to the present invention in a simple and efficient manner. The table shown assigns certain run times t, which are obtained by forming the difference between the stored beginning and end system times according to FIG. 1, to the listed programs (subroutines) with the (program) name "S." The run times are shown in the following columns of the table in the cumulated manner in absolute form and individually and again in the cumulated form as percentages of the overall run time $T=t_2+t_3+t_4+t_5+t_6$. A graphic view corresponding to last two columns of the table shows the bar chart contained in FIG. 2.

With the run time values obtained by the process according to the present invention, the user has an efficient possibility for optimizing robot control programs, which can be performed after an inspection, e.g., of the graphic view in FIG. 2, "manually" by the user, who will have weak points in the programming, which are manifested in high run time percentages for certain programs (subroutines), shown to him directly and in a nondistorted manner. However, it is also possible in the course of the process according to the present invention that certain optimization tasks are performed automatically by a program unit located downstream of the run time measurement, e.g., by an expert system, which recognizes programs with high run time percentages, such as program No. 4 in the table in FIG. 2, and optimizes them according to certain rules which are to be preset.

While specific embodiments of the invention have been shown and described in detail to illustrate the application of the principles of the invention, it will be understood that the invention may be embodied otherwise without departing from such principles.

What is claimed is:

1. A process for providing run time information of robot control computer programs for controlling industrial robots, comprising:
   providing a computer program for controlling an industrial robot;
   determining an initial start time when at least one individual robot control command of said computer program is executed;
   determining an end system time when the execution of said at least one individual robot control command of said computer program is terminated;
   determining a run time period of the execution of said at least one individual robot control command of the computer program based on said initial time and said end system time; and
   storing the run time period together with the at least one individual robot control command or the information characterizing the at least one individual robot control command.

2. A process in accordance with claim 1, wherein the point in time of the access to a memory area of a memory, which said at least one individual robot control command is associated with, and the point in time of the termination of the access to the memory area are determined and stored with the information characterizing the at least one individual robot control command.

3. A process in accordance with claim 1, wherein information characterizing the memory area associated with the at least one individual robot control command is stored with the time of execution of the at least one individual robot control command.

4. A process in accordance with claim 1, wherein after calling and before executing an individual robot control command or a sequence of individual robot control commands (subroutine), a point in time of an access to a memory area of a program memory of a computer system performing the program, which said memory area is associated with the individual robot control command or the subroutine, is determined by the computer system itself in the form of a first system time; the individual robot control command or the subroutine is subsequently executed, and a second system time of the computer system is determined by the computer system itself after the execution at the time of termination of the access to the associated memory area.

5. A process in accordance with claim 1, wherein a value of a depth of recursion is additionally determined for a sequence of individual commands in the form of a subroutine.

6. A process in accordance with claim 5, wherein a run time of the individual command or of the subroutine is determined as the difference between determined system times taking into account the value of the depth of recursion.

7. A process in accordance with claim 1, wherein the determined system times and/or a corresponding memory address and/or the depth of recursion value are stored in a nonvolatile memory.

8. A process in accordance with claim 1, wherein the determined system times and/or memory addresses and/or depth of recursion values are used by a program unit for optimization purposes for the robot control program.

9. A process in accordance with claim 8, wherein suggestions for a rearrangement of the robot control program are issued and/or automatically implemented by the program unit in the course of the optimization.

10. A process for providing run time information for robot control programs, the process comprising the steps of:

storing a computer program, together with individual robot control commands or information characterizing individual robot control commands provided for controlling an industrial robot, in a program memory associated with a robot control computer system;

executing at least a portion of the computer program with a processor of the robot control computer system, said portion comprising one or more said individual robot control commends;

determining the run time period of the execution of one or more said individual robot control commands of the computer program on the basis of the system time of the processor;

storing the determined run time period in the program memory with the determined run time linked to said one or more individual robot control commands; and optimizing said computer program based on said determined run time period associated with said one or more individual robot control commands.

11. A process according to claim 10, wherein said step of determining comprises:

determining a first system time of the processor executing the program after calling the program and before the execution of an individual robot control command or a sequence of individual robot control commands (subroutine);

subsequently executing an individual command or the subroutine of the program and determining a second system time of the computer after the execution.

12. A process according to claim 10, wherein the determination of the system times is carried out on the basis of access times to certain areas of the program memory of the computer system, which areas characterize the individual robot control commands or the subroutine, wherein the point in time of the access to the storage area of the program memory, which said storage area is associated with the at least one individual robot control command, and the point in time of the termination of the access to the memory area are determined and stored with information characterizing the at least one individual robot control command.

13. A process in accordance with claim 10, further comprising associating information characterizing at least one individual robot control command of the program with the memory area accessed during execution and the time of execution of the at least one individual robot control command and storing the associated information.

14. A process in accordance with claim 10, wherein a value of a depth of recursion is additionally determined for a sequence of individual robot control commands in the form of a subroutine.

15. A process in accordance with claim 14, wherein a run time of the individual robot control command or of the subroutine is determined as the difference between determined system times taking into account the value of the depth of recursion.

16. A process in accordance with claim 15, wherein the determined system times and/or a corresponding memory address and/or the depth of recursion value are stored in a nonvolatile memory.

17. A process in accordance with claim 15, wherein the determined system times and/or memory addresses and/or depth of recursion values are used by a program unit for optimization purposes for the robot control program.

18. A process in accordance with claim 17, further comprising providing suggestions for a rearrangement of the robot control program are issued and/or automatically implemented by a program unit in the course of an optimization.

19. A process for providing run time information for robot control programs, the process comprising the steps of:

providing a computer program, said computer program including one or more individual robot control commands for controlling an industrial robot;

providing a program memory and a processor associated with a robot control computer system, said program memory having an memory area associated with said one or more individual robot control commands;

storing said computer program in said program memory;

determining a first time and a second time, said first time corresponding to a first point in time when said processor accesses said one or more individual robot control commands associated with said memory area of said program memory, said second time corresponding to a second point in time when said processor terminates access to said one or more individual robot control commands associated with said memory area of said program memory;

determining a run time interval of the execution of said one or more individual robot control commands of said computer program based on said first time and said second time;

storing said determined run time interval in said program memory with said determined run time linked to said one or more individual robot control commands;

analyzing said determined run time interval associated with said one or more individual robot control commands;

changing said computer program based on said analysis of said determined run time interval associated with said one or more individual robot control commands to shorten a run time of said computer program.

20. A process in accordance with claim 19, wherein:

a valve of a depth of recursion is additionally determined for a sequence of individual robot control commands in the form of a subroutine; and the run time interval of the individual robot control command or if the subroutine is determined based in said first time, said second time and the value of the depth of recursion.

21. The process of claim 1, further comprising:

changing said computer program based on said determined run time period associated with said at least one individual robot control command to shorten a run time of said computer program.

* * * * *

UNITED STATES PATENT AND TRADEMARK OFFICE
CERTIFICATE OF CORRECTION

PATENT NO.         : 7,886,275 B2                                    Page 1 of 1
APPLICATION NO.    : 10/970955
DATED              : February 8, 2011
INVENTOR(S)        : Franz Grob It is certified that error appears in the above-identified patent and that said Letters Patent is hereby corrected as shown below:

Column 5
Line 63, reads "Fakultat" and should read -- Fakultät --.

Column 9
Line 9, Claim 10, reads "control commends" and should read -- control commands --.

Column 10
Lines 36-37, Claim 19, reads "robot control commands;" and should read -- robot control commands; and --.

Column 10
Line 47, Claim 20, reads "or if the subroutine is" and should read -- or of the subroutine is --.

Signed and Sealed this
Thirty-first Day of May, 2011

David J. Kappos
*Director of the United States Patent and Trademark Office*